United States Patent
Sulcer, Jr.

(10) Patent No.: US 6,485,037 B1
(45) Date of Patent: Nov. 26, 2002

(54) HAND TRUCK FOR MUSICAL DRUMS

(76) Inventor: John L. Sulcer, Jr., 2705 Pineridge Dr., NW., Apt. B, Walker, MI (US) 49544

( * ) Notice: Subject to any disclaimer, the term of this patent is extended or adjusted under 35 U.S.C. 154(b) by 0 days.

(21) Appl. No.: 09/607,160

(22) Filed: Jun. 29, 2000

Related U.S. Application Data
(60) Provisional application No. 60/142,183, filed on Jul. 1, 1999.

(51) Int. Cl.⁷ .................................................. B62B 1/26
(52) U.S. Cl. .................................... 280/47.26; 280/79.2
(58) Field of Search ........................... 280/47.19, 47.26, 280/47.28, 47.35, 79.2; 84/DIG. 3, 453, 421; 206/314

(56) References Cited

U.S. PATENT DOCUMENTS

| | | | | |
|---|---|---|---|---|
| 501,318 A | * | 7/1893 | Boulanger | 206/314 |
| 2,058,184 A | * | 10/1936 | Sherrard | 280/47.35 |
| 2,274,048 A | * | 2/1942 | Derman | 280/79.2 |
| 2,590,178 A | * | 3/1952 | Jamison | 280/47.26 |
| 2,905,480 A | * | 9/1959 | Giovannelli | 280/47.26 |
| 3,155,231 A | * | 11/1964 | Vinas | 206/314 |
| 4,029,327 A | * | 6/1977 | Kolstein | 280/47.131 |
| 4,433,781 A | * | 2/1984 | Hummel | 206/314 |
| 4,836,565 A | * | 6/1989 | Catalo | 280/47.26 |
| 5,088,377 A | * | 2/1992 | Delecaris | 206/314 |
| 5,333,885 A | * | 8/1994 | Pullman | 280/47.26 |
| 5,489,106 A | * | 2/1996 | Engelking et al. | 280/47.35 |
| 5,816,395 A | * | 10/1998 | Dougherty | 206/314 |
| 5,977,464 A | * | 11/1999 | Bencomo, Jr. | 84/421 |
| 6,073,944 A | * | 6/2000 | Moore | 280/47.26 |
| 6,099,023 A | * | 8/2000 | Be | 280/47.19 |
| 6,123,344 A | * | 9/2000 | Clegg | 280/47.19 |
| 6,145,801 A | * | 11/2000 | Herring, Jr. | 248/463 |

FOREIGN PATENT DOCUMENTS

WO  91/05720  * 5/1991 ............. 280/47.26

* cited by examiner

Primary Examiner—Frank Vanaman
(74) Attorney, Agent, or Firm—Donald J. Ersler

(57) ABSTRACT

Accordingly, a hand truck for musical drums of the invention facilitates storage, transport, protection, and control of drums and drum accessories. The hand truck for musical drums of the invention has a frame and a plurality of drum compartments within the frame. Each compartment has an arcuate inner wall that corresponds to a preselected drum, which is protectively releasably received in the corresponding compartment. A wheel assembly and a handle are connected with the frame and facilitate cart transport of a drum set in the compartments. Further compartments may also be provided for accessories.

9 Claims, 4 Drawing Sheets

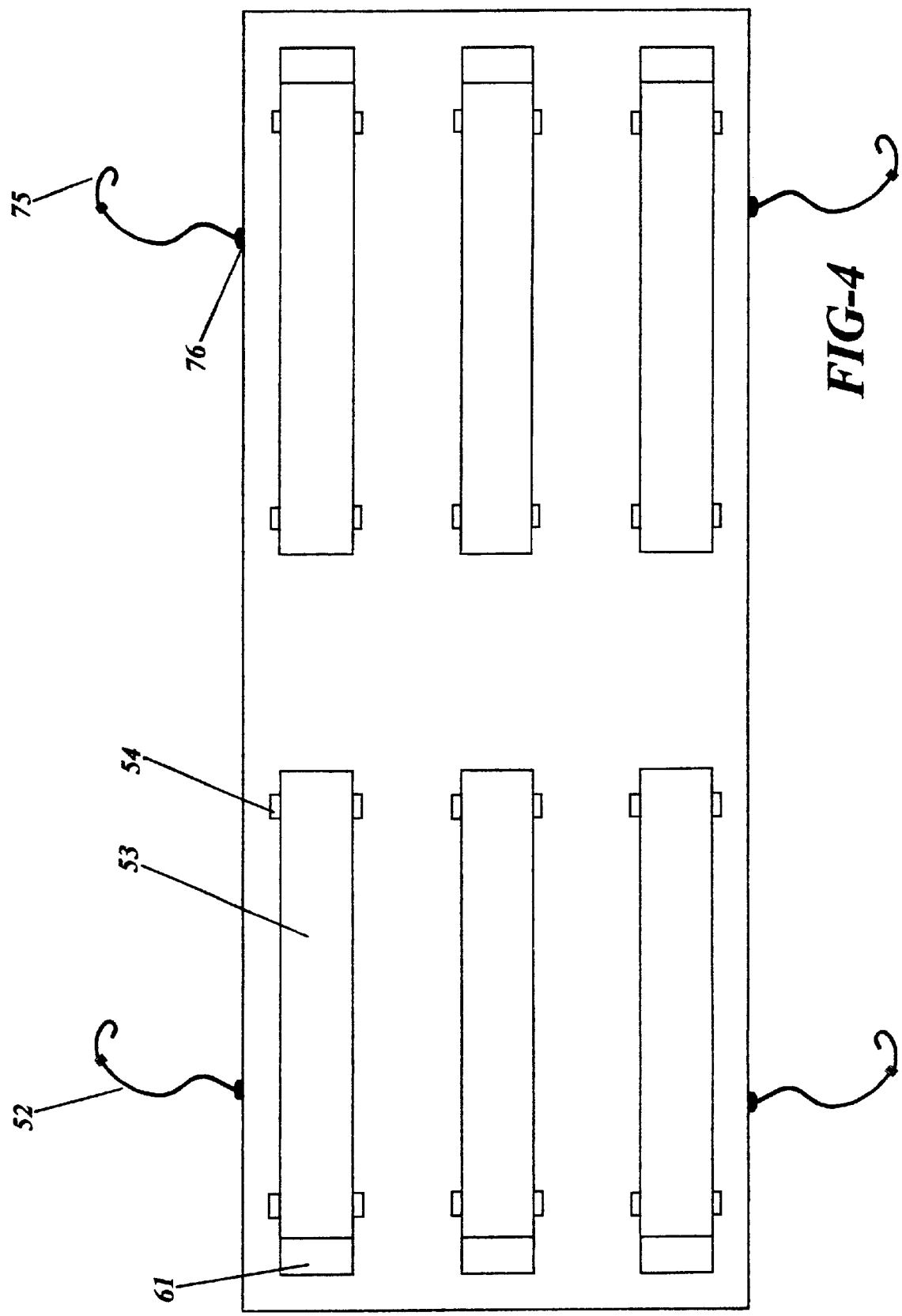

HAND TRUCK FOR MUSICAL DRUMS

CROSS-REFERENCES TO RELATED APPLICATIONS

This is a continuation in part application of co-pending U.S. Provisional Patent Application Serial No. 60/142,183, entitled Two Wheeled U-Shaped Handtruck for Musical Drums and filed on Jul. 01, 1999 by John L. Sulcer, Jr., the disclosure of which is incorporated here by reference.

STATEMENT REGARDING FEDERALLY SPONSORED RESEARCH OR DEVELOPMENT

Not Applicable.

BACKGROUND OF THE INVENTION

The invention relates to carts and the like for musical drums. More particularly, the invention relates to an integrated drum case and transport cart or dolly.

A drummer, being one who plays drums, will commonly use a number of drums in the performance of music and the like. The drums used may be said to comprise a drum set. Each drum in a drum set may be an expensive instrument individually. Thus, the set may be all the more expensive. Accordingly, one will prefer to care for the drums and will commonly transport and store the drums in protective cases, which may each include a body and a lid. Further, stands and other accessories are typically employed with a drum set to facilitate the playing of the drums. One may readily see, then that a large and unwieldy number of case components and accessories accompanies a drum set. One may further appreciate a great desire to control and simplify the handling and use of the drums, cases, and accessories.

Generally, hand trucks are comprised of an open framework configuration with side rails along with opposing receiving structural adjoining braces which are spaced vertically along the frame in addition to forwardly disposed adjacent nose portions supported by wheels, generally adapted for use in transporting various objects such as boxes, cartons, and cylinders with the load being supported by the vertically inclined framework and the forwardly disposed nose portion. There are also other types of hand trucks with an open framework configuration along with various assemblies and compartments to accommodate specific applications such as transporting laundry, garbage cans, and welding equipment. Hand trucks intended for curvilinear loads are normally provided with arcuate structural adjoining braces, and usually without any type of outer protection for fragile loads. Generally, owners of these hand trucks use them for industrial purposes such as transporting heavy barrels, kegs, or cylinders, and curvilinear loads of an industrial nature usually are not fragile, and do not require any type of protection for the load surface, and since musical drums and related equipment are fragile in design, typical industrial hand trucks with standard arcuate structural adjoining braces are not suitable for transporting musical drums and related equipment due to the overall dimensions of the hand truck, and also due to movement of the musical drums against the structural adjoining braces during use which would cause surface damage to the musical drums and related equipment.

In regard to standard musical drum cases, typically they consist of a simplified cylinder and handle, with a dimensionally uniform terminus on the lower half, while the upper half embodies an aperture portion which inwardly accepts a certain musical drum of a corresponding smaller diameter and in some instances, optional drum support foam pieces, and outwardly receives a provided lid of a corresponding larger diameter along with some type of latching device for temporary closure which when assembled, forms a completed apparatus and provides adequate protection during transport for a certain musical drum, wherein the load is supported by the upper and lower half of the case, or by optional upper and lower inner drum support foam pieces. Typically these types of cases are cumbersome to assemble and disassemble, and are difficult to store when not in use, and in addition, are usually transported in pairs. Therefore it is not possible to transport an entire musical drum set configuration in one movement.

BRIEF SUMMARY OF THE INVENTION

Accordingly, a hand truck for musical drums of the invention facilitates storage, transport, protection, and control of drums and drum accessories. The hand truck for musical drums of the invention has a frame and a plurality of drum compartments within the frame. Each compartment has an arcuate inner wall that corresponds to a preselected drum, which is protectively releasably received in the corresponding compartment. A wheel assembly and a handle are connected with the frame and facilitate cart transport of a drum set in the compartments. Further compartments may also be provided for accessories.

The invention (which is PTO Disclosure Document Number 420748, dated Jun. 11, 1997) is a new and useful design of a hand truck and case for musical drums that provides for movement and storage of musical drums and related equipment. Load-supporting removable drum support foam pieces and other U-shaped storage compartments are secured and nested inside a protective arcuate shell supported by a U-shaped framework configuration that includes support wheels. The invention is generally adapted for use in either a vertical movement position, or a horizontal load/unload position. A first handle is provided to propel and maneuver the hand truck, while a second handle is provided to aid in the stability of the hand truck or to aid in maneuvering the hand truck with the handle.

A new and useful design of a hand truck and case for musical drums that forms a vehicle for movement and storage of musical drums and related equipment that incorporates a tubular frame with an upper propelling handle, and a lower handle supported by wheels, with U-shaped structural adjoining braces, that further support a hook and loop fastener lined arcuate protective shell with upper and lower stationary end panels in which are nested cymbal and bass drum pedal storage compartments, as well as U-shaped drum support foam pieces, that are also lined with hook and loop fastener material, can be secured inside the protective shell into a configuration relative to a given drum set whose quantity of drums are relative to the number of drum support foam pieces with one piece per drum. Each drum is placed inside a drum support foam piece securing the musical drum around the lower half independently. Also incorporated in to the protective shell are the cymbal and bass drum pedal storage compartments, which are both stationary, and are located toward the upper half for convenience purposes.

Inside the cymbal storage compartment is a cymbal support foam piece in which are a series of U-shaped protective slots circularly cut into a configuration relative to the number of cymbals within a drum set configuration with one slot per cymbal. Each cymbal is placed into a slot that corresponds dimensionally to each particular cymbal with the inner dimensions of the foam slots securing the cymbal along its outer edges and surface.

Inside the bass drum pedal storage compartment are foam bass drum pedal cushioning pieces. These foam pieces cover all four sides of the compartment as well as under the lid. The bass drum pedal is simply placed into the drum pedal compartment with the bottom foam supporting the drum pedal independently and the foam side pieces cushioning the drum pedal.

And finally, the vehicle is covered with a protective lid. This lid which is square in shape and spans the entire length and width of the shell, is flat on one side while having a series of lid foam pieces on the other, which support the musical drums from the top and are secured into a configuration relative to the dimensions of a given drum set configuration where the quantity of foam pieces are relative to number of drums with one foam piece per drum.

These and other features, objects, and benefits of the invention will be recognized by one having ordinary skill in the art and by those who practice the invention, from the specification, the claims, and the drawing figures.

BRIEF DESCRIPTION OF THE SEVERAL VIEWS OF THE DRAWING

FIG. 4 is a top plan view thereof.

DETAILED DESCRIPTION OF THE INVENTION

Figure 1:
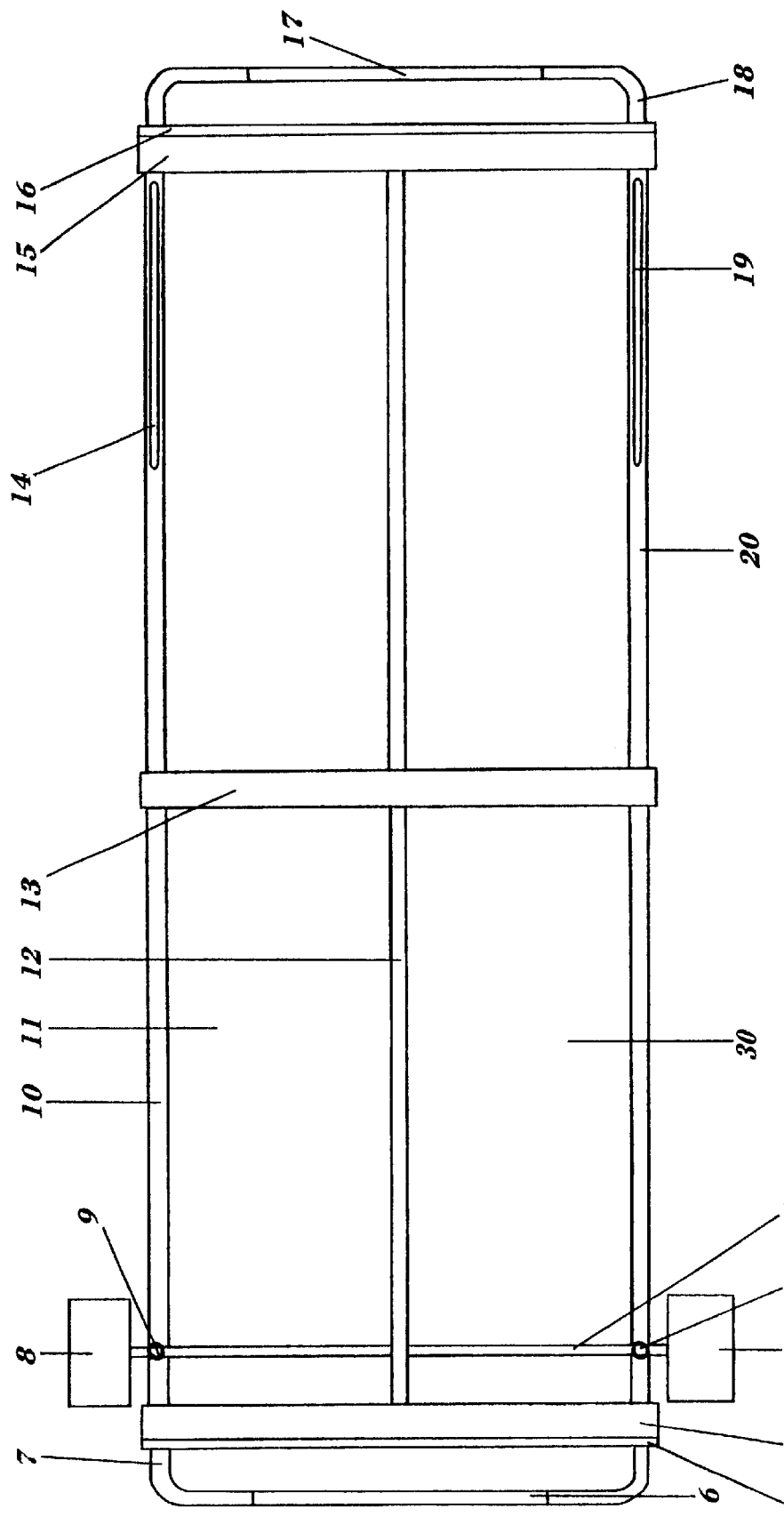
FIG. 1 is a bottom plan view of a hand truck for musical drums according to the invention.
Figure 2:
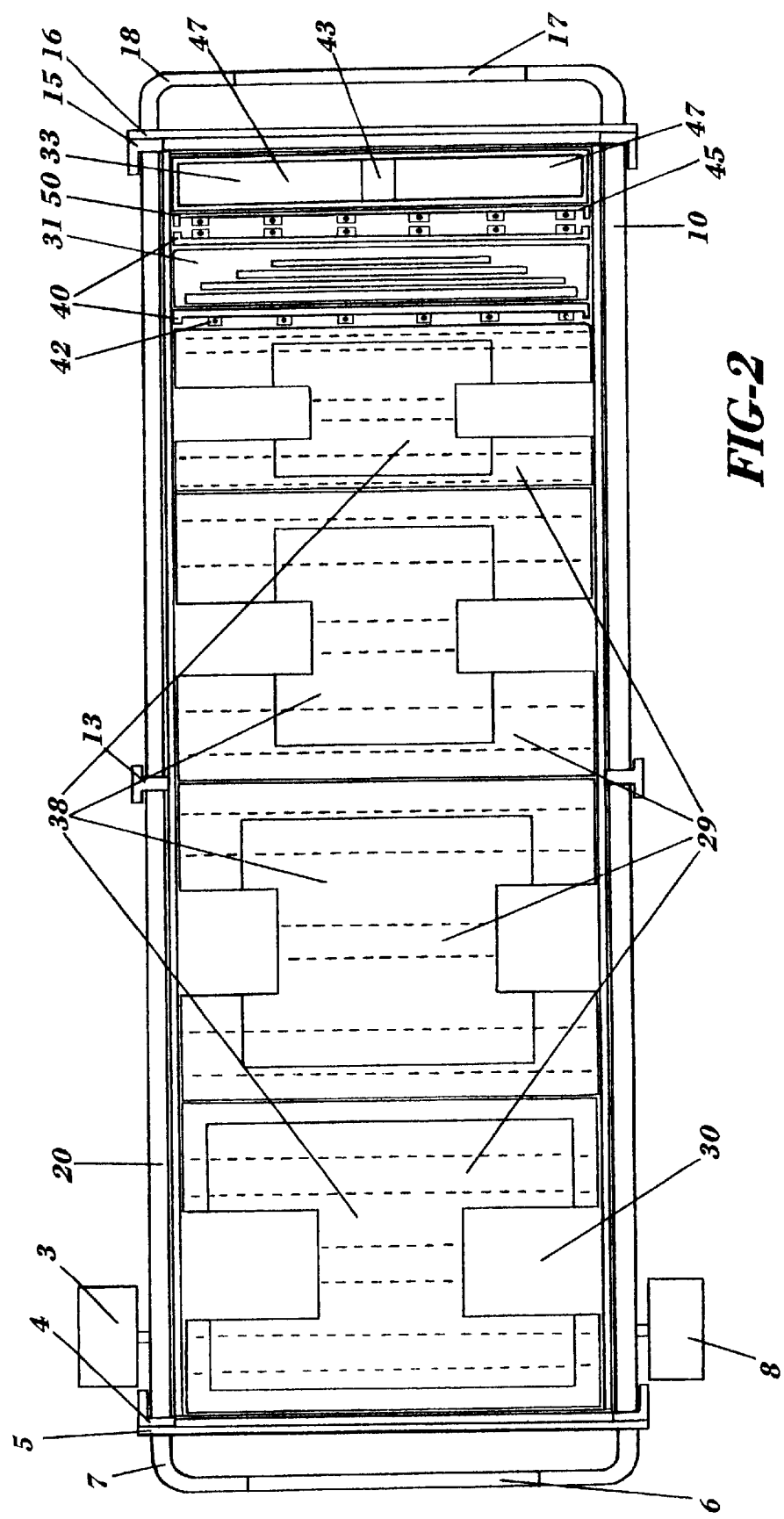
FIG. 2 is a top plan view thereof, with the lid removed.

A typical embodiment of the hand truck 60 of the present invention is illustrated in FIG. 1 (bottom view) and FIG. 2 (top view).

Referring now more particularly to the accompanying drawings, and in the first instance to frame 62 shown in FIG. 1, numerals 4 and 15 indicate two end brackets composed of L-shaped aluminum material. Numeral 13 designates a center bracket, which is usually comprised of T-shaped aluminum material. The brackets have parallel sides and a curved or radiused bottom extending between lower ends of the sides. These brackets have three holes located in each within the laterally protruding portions of each bracket, with one on each side at the end of the radius, and one at the bottom center of the radius in order to accommodate the tubular frame pieces 10, 12, and 20 that are installed and permanently secured. It should be noted that the frame pieces 10 and 20 have right and left frame support legs 14 and 19 attached in the form of skids. Right and left struts 9 and 2 are perpendicularly attached, each with an orifice, as well as the center tubular frame piece 12. It can be seen that all three holes are aligned into which an axle 1 is inserted and permanently secured where upon are mounted the right and left pneumatic wheels 8 and 3.

At each end of the hand truck are identical front and rear end panels 5 and 16 that are cut or machined to conform in size and shape to the outer most dimensions of the front and rear adjoining brackets 4 and 15 onto which the panels are riveted. It should be noticed that the panels have a hole on each side that allows for the joining of the right and left tubular frame pieces 10 and 20, with the front and rear tubular handles 7 and 18 which are also fashioned of aluminum, whereupon foam handle grips 6 and 17 are connected.

Now referring to FIG. 2, an inner panel 30 is U-shaped and most preferably comprises a thin square sheet of plastic, such as polypropylene, for example. Inner panel 30 is riveted or otherwise attached to the end brackets 4 and 15 which now along with the end panels, forms a type of U-shaped protective enclosure that is inwardly covered with a series of hook and loop closure strips 29, with one of the hook and the loop portions being attached along the inner panel, and the other of the hook and the loop portions being affixed to the outside of the drum support foam pieces 38 that are U-shaped and uniform in size along their outer dimensions as well as being U-shaped inwardly. The foam pieces may vary in size along their inner dimensions from one end of the frame to the other, with a preferred arrangement being in a configuration from large to small. These foam pieces can be either molded or glued together from separate cut or machined pieces to form their respective shapes. The inner curvature of each piece is selected to mate with the outer curvature of the side of a drum to be supported by that piece, such that multiple drums are stored with their flat faces facing each other and their axes parallel.

Succeedingly to be examined within FIG. 2 is a cymbal storage foam piece 31, which is basically a solid foam block with compartments or slots that are also U-shaped. The block is either molded or glued together from separate cut or machined pieces to form its respective shape. The foam piece 31 is sandwiched between two cymbal storage end panels 40 that are likewise U-shaped and may also be comprised of sheets of polypropylene in addition to having a sequence of mounting tabs 42 that are each cut and bent to a 90 degree angle along with a hole to facilitate attachment to the inner panel 30 through the use of rivets. These panels can either be molded or cut from separate pieces to form their respective shapes.

And finally within FIG. 2 is a bass drum pedal storage compartment 33 which is a foam piece that is U-shaped along its outer dimensions, but is square in shape along its inner dimensions in addition to containing a divider portion 43 located in the center to form two separate smaller compartments 47. This foam piece can be either molded or glued together from separate cut or machined pieces to form its respective shape, and is sandwiched between the rear end panel 16 and the bass drum pedal compartment end panel 50 which is identical in shape to the cymbal storage end panels 40 and is comprised of a thin sheet of polypropylene in addition to also having a sequence of mounting tabs 45 that are each cut and bent to a 90 degree angle along with a hole to facilitate attachment to the inner panel 30 through the use of rivets.

From the above and previous descriptions a number of advantages of my two wheeled handtruck for musical drums become evident:

(a) With the use of aluminum and polypropylene the handtruck will be fairly simple and cost effective to manufacture, and quantities of these types of materials are quite plentiful.

(b) The frame design along with aluminum as the primary material, will make the handtruck rigid and durable in addition to complementing the torsional characteristics, so that the handtruck can absorb the downpressure created from holding an entire musical drum set.

(c) The design and materials of the handtruck provide excellent protection against the elements such as rain and snow for the musical drums and related equipment as well as the handtruck itself.

(d) The handtruck generally allows for the transfer of drums to and from the cart in a horizontal position, with the foam pieces being stationary which will make loading and unloading quicker and easier.

(e) Separate foam compartments cushion, stabilize, and provide adequate inward protection during movement for the musical drums and related equipment.

(f) The drum support foam pieces, with the use of hook and loop fasteners, are removable and replaceable to accommodate a different size or quantity of drums resulting from a change within a musical drum set.

(g) An entire musical drum set can be contained within a single handtruck, therefore the drum set can be moved from the loading area to a vehicle in one step, thus making the movement of an entire drum set quicker and easier.

Figure 3:
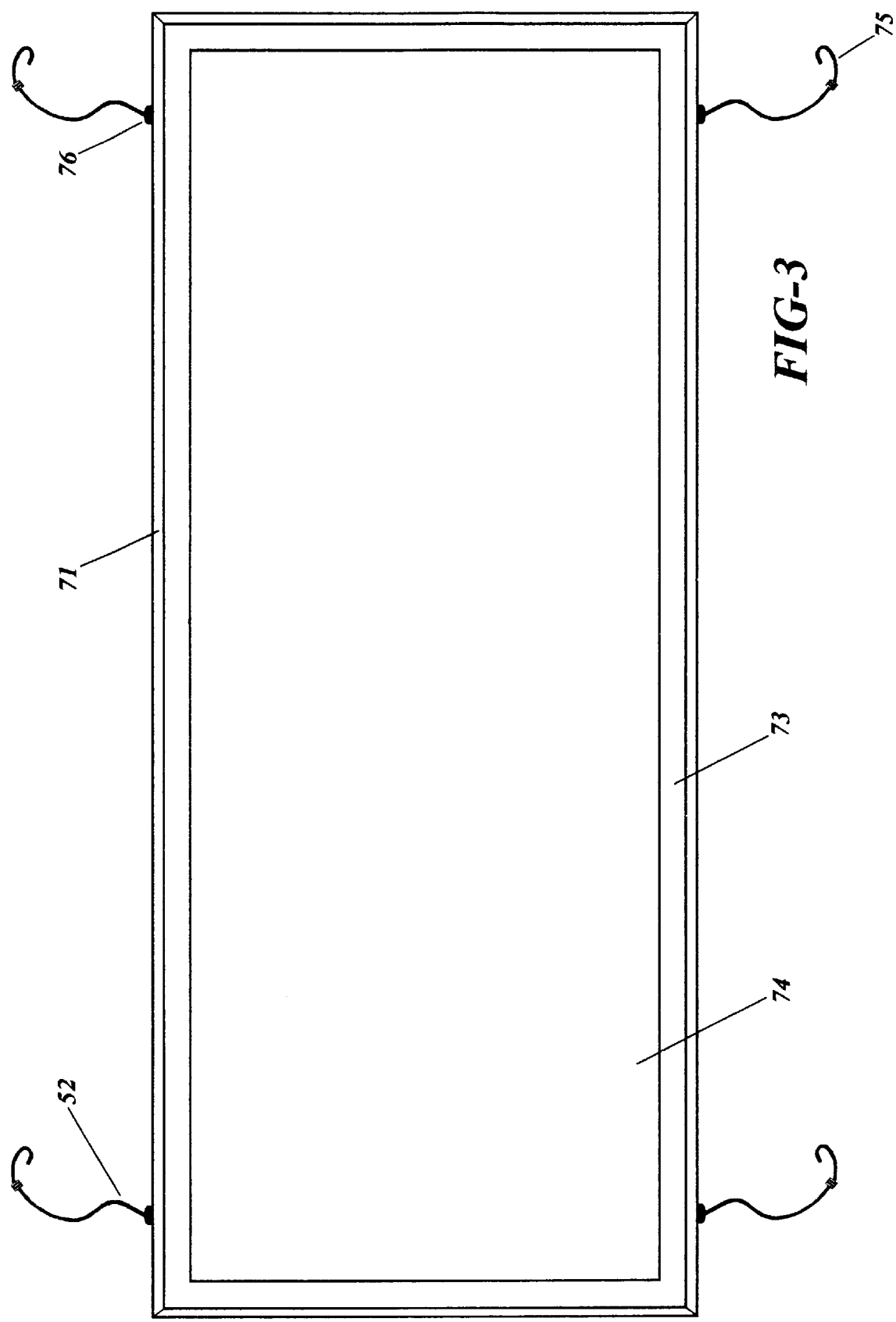
FIG. 3 is a bottom plan view of the lid.

The manner of using the hand truck for musical drums of the invention is not identical to that of prior hand trucks in present use. Namely, one first grasps the rear handle 18 (FIG. 1) and propels the handtruck through the use of wheels 3 and 8 in a somewhat inclined vertical position to a desired loading area. Next, the handtruck is positioned horizontally resting upon the right and left frame support legs 14 and 19. Then one disengages the latches 52 (FIG. 3), which comprise elastic fastening cords having hooks 75 at outer ends and mounts 76 at inner ends, and removes the entire protective lid 71 in a basically upward direction and can be stored wherever desired. The lid comprises an upper lid panel 73 and a lid foam piece 74 attached to the panel for engaging the drums.

Now one grasps a musical drum from a dismembered drum set and the drum is then inserted into one of the drum support foam pieces 38 (FIG. 2). Each drum is placed inside of a removable drum support foam piece 38 that corresponds dimensionally to each particular drum, with the inner dimensions of the foam piece securing the drum around the lower half independently. Also, the quantity of removable foam pieces are relative to the quantity of drums within a drum set, with one foam piece per drum.

Next, one obtains a cymbal from the dismembered drum sets and the cymbal is then inserted into the cymbal storage foam piece 31. Each cymbal is placed into a slot that corresponds dimensionally to each particular cymbal with inner dimensions of the foam slots securing the cymbal along its outer edges and surface, and likewise in similarity to the drum support foam pieces, the quantity of cymbals within a drum set with one slot per cymbal.

In the next step, one grasps a bass drum pedal (not shown) from the drum set and the bass drum pedal is inserted into one of the storage compartments 47, with the bass drum pedal being supported by the foam pieces.

Finally, the protective lid (FIG. 3) is reattached and the latches or elastic fastening cords 52 are engaged with the frame. A number of outer storage compartments or storage tubes 53 (FIG. 3) may be attached to an outer side of the lid by storage tube mounts 54, and used for storage, transport, and protection of various accessories, including without limitation, drum stand components. Covers or end caps 61 cover the ends of the storage compartments. When ready, the loaded handtruck can be propelled to some type of vehicle. In the event of an incline or stairs between the loading area and the vehicle, the front handle 7 (FIG. 1) can be used by another to assist in moving the handtruck up the stairs or incline. Unloading is the reverse of loading.

It will be understood by one having ordinary skill in the art and by those who practice the invention, that various modifications and improvements may be made without departing from the spirit of the disclosed concept. Various relational terms, including left, right, front, back, top, and bottom, for example, are used in the detailed description of the invention and in the claims only to convey relative positioning of various elements of the claimed invention. The scope of protection afforded is to be determined by the claims and by the breadth of interpretation allowed by law.

I claim:

1. A drum cart comprising:

a frame having an arcuate shaped bottom with straight side walls extending upward from each end of said arcuate shaped bottom, said side walls being spaced apart to receive at least one drum;

a pair of wheels being attached to one end of said frame;

a handle extending from at least one end of said frame;

at least two drum support pieces being attached to said bottom of said frame, each one of said at least two drum support pieces protecting a single drum;

means for retaining the single drum in each one of said at least two drum support pieces; and a lid being sized to be received by a top of said frame, said lid having a plurality of hardware storage tubes for the storage of various accessories.

2. The drum cart of claim 1 wherein:

said at least two drum support pieces being fabricated from a foam material.

3. The drum cart of claim 1, further comprising:

a drum accessory storage compartment being formed in said frame to receive at least one drum accessory.

4. The drum cart of claim 3, further comprising:

said drum accessory storage compartment being lined with a foam material.

5. The drum cart of claim 1, further comprising:

said means for retaining the single drum being at least one strip.

6. A drum cart comprising:

a frame having an arcuate shaped bottom with straight side walls extending upward from each end of said arcuate shaped bottom, said side walls being spaced apart to receive at least one drum;

a pair of wheels being attached to one end of said frame;

a handle extending from at least one end of said frame;

at least two drum support pieces being attached to said bottom of said frame, each one of said at least two drum support pieces protecting a single drum;

a drum accessory storage compartment being formed in said frame to receive at least one drum accessory; and a lid being sized to be received by a top of said frame, said lid having a plurality of hardware storage tubes for the storage of various accessories.

7. The drum cart of claim 6, further comprising:

said at least one drum support piece being fabricated from a foam material.

8. The drum cart of claim 6, further comprising:

said drum accessory storage compartment being lined with a foam material.

9. The drum cart of claim 6, further comprising:

at least one strip for retaining the single drum in said drum support piece.

* * * * *